(12) United States Patent
Khandelwal et al.

(10) Patent No.: US 12,504,417 B2
(45) Date of Patent: Dec. 23, 2025

(54) LAGRANGIAN SMART SENSING SYSTEM FOR CHARACTERIZING AQUATIC RESOURCES

(71) Applicant: UNM RAINFOREST INNOVATIONS, Albuquerque, NM (US)

(72) Inventors: Aashish Sanjay Khandelwal, Albuquerque, NM (US); Ricardo Gonzalez-Pinzon, Albuquerque, NM (US); Tzion Castillo, Albuquerque, NM (US)

(73) Assignee: UNM RAINFOREST INNOVATIONS, Albuquerque, NM (US)

( * ) Notice: Subject to any disclaimer, the term of this patent is extended or adjusted under 35 U.S.C. 154(b) by 218 days.

(21) Appl. No.: 18/479,244

(22) Filed: Oct. 2, 2023

(65) Prior Publication Data

US 2024/0133856 A1 Apr. 25, 2024

Related U.S. Application Data

(60) Provisional application No. 63/378,407, filed on Oct. 5, 2022.

(51) Int. Cl.
*G01N 33/18* (2006.01)
*B63B 79/15* (2020.01)
(Continued)

(52) U.S. Cl.
CPC .......... *G01N 33/18* (2013.01); *B63B 79/15* (2020.01); *B63B 79/40* (2020.01); *B63H 21/21* (2013.01);
(Continued)

(58) Field of Classification Search
CPC ........ G01N 33/18; B63B 79/15; B63B 79/40; B63B 2035/007; B63B 2035/008;
(Continued)

(56) References Cited

U.S. PATENT DOCUMENTS 10,059,418 B1 * 8/2018 Miles .................... B63H 25/04
11,097,813 B2 8/2021 Yu
(Continued)

FOREIGN PATENT DOCUMENTS

IN 202131012958 A 4/2021
TR 202000484 A2 7/2020
(Continued)

OTHER PUBLICATIONS

Blaen, Phillip J. et al. "Real-time monitoring of nutrients and dissolved organic matter in rivers: Capturing event dynamics, technological opportunities and future directions." Science of the Total Environment 569 (2016): 647-660.
(Continued)

*Primary Examiner* — Francis C Gray
(74) *Attorney, Agent, or Firm* — MH2 Technology Law Group LLP

(57) ABSTRACT

Techniques for large-scale Lagrangian monitoring of an aquatic resource are presented. The techniques use a system that includes an autonomous surface vehicle, where the autonomous surface vehicle includes: an electronic controller; a power source coupled to the electronic controller; a plurality of sensors communicatively coupled to the electronic controller, the plurality of sensors including: a water quality sensor and a GPS sensor; and a propulsion system communicatively coupled to the electronic controller, the propulsion system including a thruster and at least one
(Continued)

rudder; where the system determines a velocity of water in the aquatic resource based on a plurality of position signals from the GPS sensor.

20 Claims, 12 Drawing Sheets

(51) Int. Cl.
*B63B 79/40* (2020.01)
*B63H 21/21* (2006.01)
*G05D 1/43* (2024.01)

(52) U.S. Cl.
CPC ............ *G05D 1/43* (2024.01); *B63B 2213/02* (2013.01); *B63H 2021/216* (2013.01)

(58) Field of Classification Search
CPC .... B63B 2213/02; B63H 21/21; B63H 25/04; B63H 2021/216; G05D 1/43; G05D 2105/80; G05D 2107/28; G05D 2109/34; G05D 1/2247
See application file for complete search history.

(56) References Cited

U.S. PATENT DOCUMENTS

| | | | |
|---|---|---|---|
| 11,334,794 | B2 | 5/2022 | Celano et al. |
| 2013/0118239 | A1 | 5/2013 | Forstmeier |
| 2015/0370252 | A1 | 12/2015 | Hanson et al. |
| 2019/0339700 | A1* | 11/2019 | Berg ................ B63H 9/061 |
| 2021/0048544 | A1* | 2/2021 | Wolfel .............. B63G 8/001 |
| 2022/0178690 | A1 | 6/2022 | Wallace et al. |
| 2022/0404328 | A1* | 12/2022 | Reisfeld ............ B63B 35/32 |

FOREIGN PATENT DOCUMENTS

| | | | | |
|---|---|---|---|---|
| WO | 2021257657 | A1 | 12/2021 | |
| WO | WO-2022144426 | A1 * | 7/2022 | .......... G05D 1/0206 |
| WO | WO-2023192564 | A1 * | 10/2023 | ............ B63B 35/44 |

OTHER PUBLICATIONS

Boano, Fulvio et al. "Hyporheic flow and transport processes: Mechanisms, models, and biogeochemical implications." Reviews of geophysics 52.4 (2014): 603-679.

Buytaert, Wouter et al. "Citizen science in hydrology and water resources: opportunities for knowledge generation, ecosystem service management, and sustainable development." Frontiers in Earth Science 2 (2014): 26.

Fountain, Henry. "Southwest drought rivals those of centuries ago, thanks to climate change." The New York Times (2020).

Heisler, John et al. "Eutrophication and harmful algal blooms: a scientific consensus." Harmful algae 8.1 (2008): 3-13.

Kirchner, James W. et al. "The fine structure of water-quality dynamics: The (high-frequency) wave of the future." Hydrological processes 18.7 (2004): 1353-1359.

Krause, Stefan et al. "Ecohydrological interfaces as hot spots of ecosystem processes." Water Resources Research 53.8 (2017): 6359-6376.

Krause, Stefan et al. "Frontiers in real-time ecohydrology—a paradigm shift in understanding complex environmental systems." Ecohydrology 8.4 (2015): 529-537.

Oroza, Carlos et al. "Design of a network of robotic Lagrangian sensors for shallow water environments with case studies for multiple applications." Proceedings of the Institution of Mechanical Engineers, Part C: Journal of Mechanical Engineering Science 227.11 (2013): 2531-2548.

Sobota, Daniel J. et al. "Cost of reactive nitrogen release from human activities to the environment in the United States." Environmental Research Letters 10.2 (2015): 025006.

Smith, Val H. et al. "Eutrophication of freshwater and marine ecosystems." Limnology and oceanography 51.1part2 (2006): 351-355.

Van Sebille, Erik et al. "Lagrangian ocean analysis: Fundamentals and practices." Ocean modelling 121 (2018): 49-75.

* cited by examiner

LAGRANGIAN SMART SENSING SYSTEM FOR CHARACTERIZING AQUATIC RESOURCES

RELATED APPLICATION

This application claims the benefit of U.S. Provisional Patent Application No. 63/378,407, filed Oct. 5, 2022, and entitled, "LAGRANGIAN SMART SENSING SYSTEM FOR CHARACTERIZING AQUATIC RESOURCES," which is hereby incorporated by reference in its entirety.

STATEMENT OF GOVERNMENT INTEREST

This invention was made with government support under 1914490 and 2054444 awarded by the National Science Foundation. The government has certain rights in the invention.

FIELD

This disclosure relates generally to determining properties of an aquatic resource.

BACKGROUND

The U.N. climate change 2021 report indicates that climate change drastically influences the water cycle, changes flow patterns and impact the water quality of freshwater supplies. There is a shortage of reliable, continuous, and consistent information on the extent and dynamics of freshwater quality and quantity at local, regional, and global scales. Most freshwater aquatic studies rely on Eulerian monitoring, i.e., water quality and quantity are monitored using grab samples or semi-continuous sensors deployed at fixed locations. However, Eulerian monitoring provides a limited understanding of spatial and temporal heterogeneity and their effects on environmental processes. The water industry currently lacks the technology to monitor freshwater resources in both space and time, and a framework that can transmit data and facilitate integration with existing infrastructure to support real-time decision-making.

SUMMARY

According to various embodiments, a system for large-scale Lagrangian monitoring of an aquatic resource is presented. The system includes an autonomous surface vehicle, where the autonomous surface vehicle includes: an electronic controller; a power source coupled to the electronic controller; a plurality of sensors communicatively coupled to the electronic controller, the plurality of sensors comprising: a water quality sensor and a GPS sensor; and a propulsion system communicatively coupled to the electronic controller, the propulsion system comprising a thruster and at least one rudder; wherein the system determines a velocity of water in the aquatic resource based on a plurality of position signals from the GPS sensor.

Various optional features of the above system embodiments include the following. The water quality sensor may include at least one of: a temperature sensor, a dissolved oxygen sensor, a conductivity sensor, a pH sensor, a turbidity sensor, an oxidation-reduction potential sensor, a chlorophyll sensor, a photosynthetically active radiation sensor, a partial pressure of carbon dioxide sensor, or a dissolved methane sensor. The autonomous surface vehicle may further include a depth sonar sensor communicatively coupled to the electronic controller. The autonomous surface vehicle may further include a radio frequency transmitter and a cellular modem communicatively coupled to the electronic controller, the system further comprising: a visualization portal in communication with the autonomous surface vehicle via the radio frequency transmitter and cellular modem, wherein the visualization portal displays readings from at least one of the plurality of sensors in real time. The autonomous surface vehicle may be hydrostatically stable. The system may include a camera communicatively coupled to the electronic controller, wherein the electronic controller is configured to identify an obstacle using the camera and avoid the obstacle using the propulsion system. The autonomous surface vehicle may be configured to autonomously switch between active navigation using the propulsion system and passive navigation according to a current of the aquatic resource. The electronic controller may acquire readings from the plurality of sensors at least once per two-minute interval. The autonomous surface vehicle may have a navigation range of at least 45 km. The autonomous surface vehicle may have a weight of less than 20 kg.

According to various embodiments, a method of large-scale Lagrangian monitoring of an aquatic resource is presented. The method includes: deploying an autonomous surface vehicle in the aquatic resource, the autonomous surface vehicle comprising: an electronic controller, a power source coupled to the electronic controller, a plurality of sensors communicatively coupled to the electronic controller, the plurality of sensors comprising: a water quality sensor and a GPS sensor, and a propulsion system communicatively coupled to the electronic controller, the propulsion system comprising a thruster and at least one rudder; determining a reading of the water quality sensor; and determining a velocity of water in the aquatic resource based on a plurality of position signals from the GPS sensor.

Various optional features of the above method embodiments include the following. The water quality sensor may include at least one of: a temperature sensor, a dissolved oxygen sensor, a conductivity sensor, a pH sensor, a turbidity sensor, an oxidation-reduction potential sensor, a chlorophyll sensor, a photosynthetically active radiation sensor, a partial pressure of carbon dioxide sensor, or a dissolved methane sensor. The autonomous surface vehicle may further include a depth sonar sensor communicatively coupled to the electronic controller. The autonomous surface vehicle may further include a radio frequency transmitter and a cellular modem communicatively coupled to the electronic controller, and the method may further include: displaying, on a visualization portal in communication with the autonomous surface vehicle via the radio frequency transmitter and cellular modem, readings from at least one of the plurality of sensors in real time. The autonomous surface vehicle may be hydrostatically stable. The autonomous surface vehicle may include a camera communicatively coupled to the electronic controller, and the method may further include: identifying, by the electronic controller, an obstacle using the camera; and avoiding the obstacle using the propulsion system. The method may further include: autonomously switching, by the autonomous surface vehicle, between active navigation using the propulsion system and passive navigation according to a current of the aquatic resource. The method may further include: acquiring, by the electronic controller, readings from the plurality of sensors at least once per two-minute interval. The deploying may include deploying the autonomous surface vehicle through a range of at least 45 km. The autonomous surface vehicle may have a weight of less than 20 kg.

Combinations, (including multiple dependent combinations) of the above-described elements and those within the specification have been contemplated by the inventors and may be made, except where otherwise indicated or where contradictory.

BRIEF DESCRIPTION OF THE DRAWINGS

Various features of the examples can be more fully appreciated, as the same become better understood with reference to the following detailed description of the examples when considered in connection with the accompanying figures, in which.

DESCRIPTION OF THE EXAMPLES

Reference will now be made in detail to example implementations, illustrated in the accompanying drawings. Wherever convenient, the same reference numbers will be used throughout the drawings to refer to the same or like parts. In the following description, reference is made to the accompanying drawings that form a part thereof, and in which is shown by way of illustration specific exemplary examples in which the invention may be practiced. These examples are described in sufficient detail to enable those skilled in the art to practice the invention and it is to be understood that other examples may be utilized and that changes may be made without departing from the scope of the invent ion. The following description is, therefore, merely exemplary.

Some embodiments provide aquatic resource monitoring that combines both temporal and spatial information by collecting data along a flow path, e.g., through the use of Lagrangian monitoring. Lagrangian monitoring can include tracking water parcels as they move through aquatic systems. Lagrangian monitoring according to some embodiments can enhance the understanding of freshwater ecosystems and contribute to effective and timely management of freshwater resources. However, upfront and day-to-day costs remain prohibitively expensive in freshwater applications. Some embodiments provide cost-effective, inexpensive, lightweight, transportable, single-person deployable, Lagrangian monitoring solutions. Some embodiments provide smart sensing Lagrangian monitoring that can collect water quality parameters and transmit data in real-time, e.g., at the sub-minute scale, and follow natural flow currents, resulting in better understanding of spatiotemporal patterns and improved predictions of water quality and quantity dynamics.

A reduction to practice is described herein. The reduction to practice was deployable by a single individual. The reduction to practice included an autonomous surface vehicle for Lagrangian monitoring of freshwater ecosystems. The reduction to practice was used to quantify experimental mixing lengths downstream of a wastewater treatment plant under various flow regimes. The reduction to practice was used to investigate the role of a flood-control reservoir in controlling the propagation of wildfire disturbances through Lagrangian monitoring.

These and other features and advantages are shown and described in reference to the figures.

Figure 1:
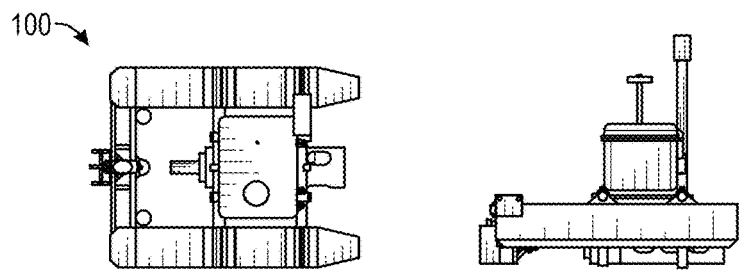
FIG. 1 depicts external diagrams of an autonomous surface vehicle for large-scale Lagrangian monitoring of an aquatic resource, according to a reduction to practice.
Figure 1:
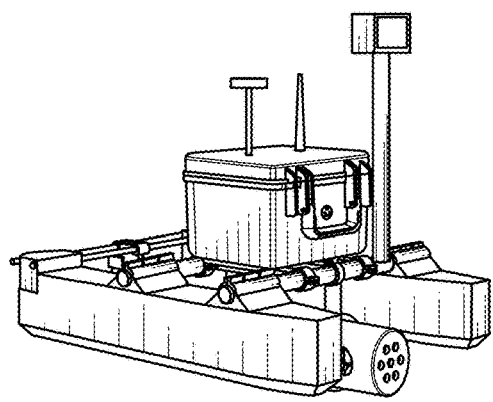
Figure 1:
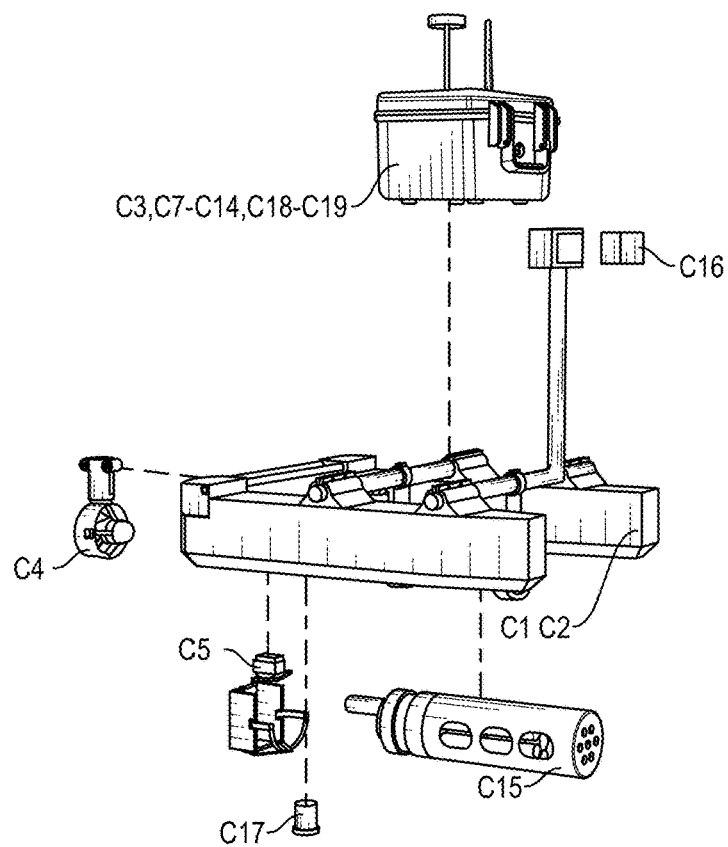

FIG. 1 depicts external diagrams 100 of an autonomous surface vehicle for large-scale Lagrangian monitoring of an aquatic resource, according to a reduction to practice. The autonomous surface vehicle was hydrostatically stable because its center of buoyancy was above its center of gravity. The reduction to practice included a GPS tracker (a Here 3) to monitor spacetime variations and allow the recovery of the vehicle, a thruster (C4) and a dual rudder (C5) system that were automated using an autopilot, a data logger that was coupled to water quality sensors (e.g., optical, wet chemistry, fluorometers), and real-time data transmission capabilities through LTE cellular service (C18). The reduction to practice was used for Lagrangian monitoring applications in river systems without major obstructions, irrigation and drainage channels, and lentic systems (e.g., lakes, reservoirs, estuaries). The reduction to practice monitored water quality parameters over longer durations than other ASVs commercially available, was lighter than other alternatives (2.5-5× lighter), offering high versatility.

The reduction to practice used a catamaran (i.e., twin hulls) framework to create a small-size surface vehicle with minimum flow resistance, better stability, and higher payload. Each hull (C1) was made of expanded polystyrene (XPS) foam and had three layers of fiberglass outside. An insulation foam sheet with a thickness of 5.1 cm was used for the hull's shape. The three layers of fiberglass cloth (approximately 50 m2) were coated outside using epoxy resin and hardener (approximately 250 ml). The two hulls were connected by a carbon fiber rod structure using 3D-printed brackets attached to the hulls (C2). Approximately 1 kg of acrylonitrile butadiene styrene (ABS) filament was used for 3D printed components (C2), including the rudders and carbon rod connections, to provide durability and UV resistance. A Pelican box (C3) housed electronics and batteries and was fastened to the front two carbon rods (C1). This rugged case featured an automatic purge valve that equalizes air pressure and a watertight silicone O-ring lid. The case protected the hardware from impacts and water splashes. The thruster (C4) and servo (C5) with rudders were mounted on the back rods (C1). Because the vehicle's weight was distributed over two hulls, the reduction to practice had a shallow draft of 125 mm.

The T200 thruster (C4) could provide a thrust force of ~3 kg, providing a cruise velocity of ~0.8 m/s. The digital servo (C5), an Annimos 20 KG with 5V power converter, controlled the steering, using a dual parallel rudder design capable of providing sharp turns (0.75 m turning radius). The servo's maximum torque was up to 21.5 kg/cm @ 6.8V. The Annimos 20 KG digital servo (C5) had high torque and full metal gear, was waterproof, and helped control the steering, with a control angle of 270°. The dual rudder system (C2) connected to the servo was 3D printed. The thruster (C4), a Blue Robotics T200, was fixed, while the rudders were mounted directly behind the thruster.

The reduction to practice had two maneuvering modes: 1) drift mode, controlled by the operator, and 2) autonomous mode, following GPS waypoints. For drift mode, the operator controlled a radio transmitter (C6), an Emax E8. The transmitter (C6) included a 2.4 GHz dual band antenna radio transmitter and featured an 8 channel RF module. The commands sent by the operator were received by the radio control receiver (C7), a RadioMaster R88. The receiver (C7) included a 2.4 GHz radio receiver for remote control, with a range of ~1 km.

The autopilot (C8), a Cube Purple with mini carrier, was designed to control boats, cars, or rovers. It provided hardware and an embedded software ecosystem to automate autonomous maneuvering. During autonomous mode, the autopilot (C8) got continuous geolocation, roll, pitch, and heading data from GPS data (C9). This allowed it to hold the course and follow GPS waypoints. The user could change between autonomous and drift modes using a switch on the controller (C6). More generally, various embodiments may automatically switch between autonomous and drift modes, e.g., to ensure conformance to a predetermined path. The geolocation, depth, roll, and pitch information were transferred continuously to the user using a telemetry transmitter (a 3DR) with a range of ~5 km (C10) on the reduction to practice and a matching receiver (C10) attached to a field laptop. Images were relayed between the reduction to practice and a ground station computer using LTE. Power was supplied to the reduction to practice through four packs of lithium polymer batteries (C11), from Ovonic. The batteries (C11) included three cells in series, which had voltage 11.1V, had a capacity of 5500 mAh, and a maximum discharge rate of 50 C. In testing, this power provided a range of ~30 km in autonomous mode. A small solar panel (C12) and a controller (C13) were added to extend the battery's capacity. The solar panel was an Eco Worthy12V, a waterproof solar panel, 41.9 cm×32 cm, and capable of providing 25 W. A GV-5 solar charge controller acted as an interface between the solar panel (C12) and the batteries (C11), preventing them from overcharging. Lithium batteries (C11) were selected because they provide a better weight-energy density ratio, high performance, and longevity. A 12V power converter was used to supply the sonde, and a 5V power converter was used to power the servo (C5) and the microcontroller board Raspberry Pi (C14). The Raspberry Pi 4 (C14) included LTE and Bluetooth communications.

The reduction to practice included a multiparameter water quality sonde Yosemitech—Model Y4000 (C15). This sonde was selected due to its compact size, low cost, and ease of integration. The Y4000 monitored dissolved oxygen, conductivity, turbidity, pH, chlorophyll, blue-green algae, and temperature. An integrated wiper system prevented biofouling, air bubbles, and debris, thus reducing erroneous data. The multiparameter sonde was controlled using the Raspberry Pi board (C14) to define temporal resolution, deploy the sensor heads, and save data files. The sonde could be calibrated using the multi-sensor PC tool by Yosemite Technologies.

The reduction to practice featured an OAK-D Lite 13 MP depth camera (C16) to collect field photographs and a 30-degree single-beam echosounder ping sonar (C17) to measure depth. The OAK-D Lite (C16) was capable of simultaneously running advanced neural networks and providing depth from two stereo cameras. The Ping Sonar (C17) was a single-beam echosounder that measured distances of up to 50 meters underwater with a 30° beam width. Depth data was used to avoid navigation through shallow depth and to collect Bathymetric Data. The camera (C16) was connected to the Raspberry Pi board (C14) and the sonar was connected to the autopilot (C8). The reduction to practice had an LTE modem with a cellular SIM card (C18), a ZTE MF833V, connected to the Raspberry Pi (C14) to transfer real-time data that can be shared worldwide. The LTE modem provided a mobile internet connection to the Raspberry Pi and real-time data transfer. Blue Robotics WetLink Penetrators (C18) were used to have watertight seal electrical cables as they pass into the pelican case (C3). Each set of penetrators (C18) included a bulkhead, seal, plug, O-ring, and nut.

Figure 2:
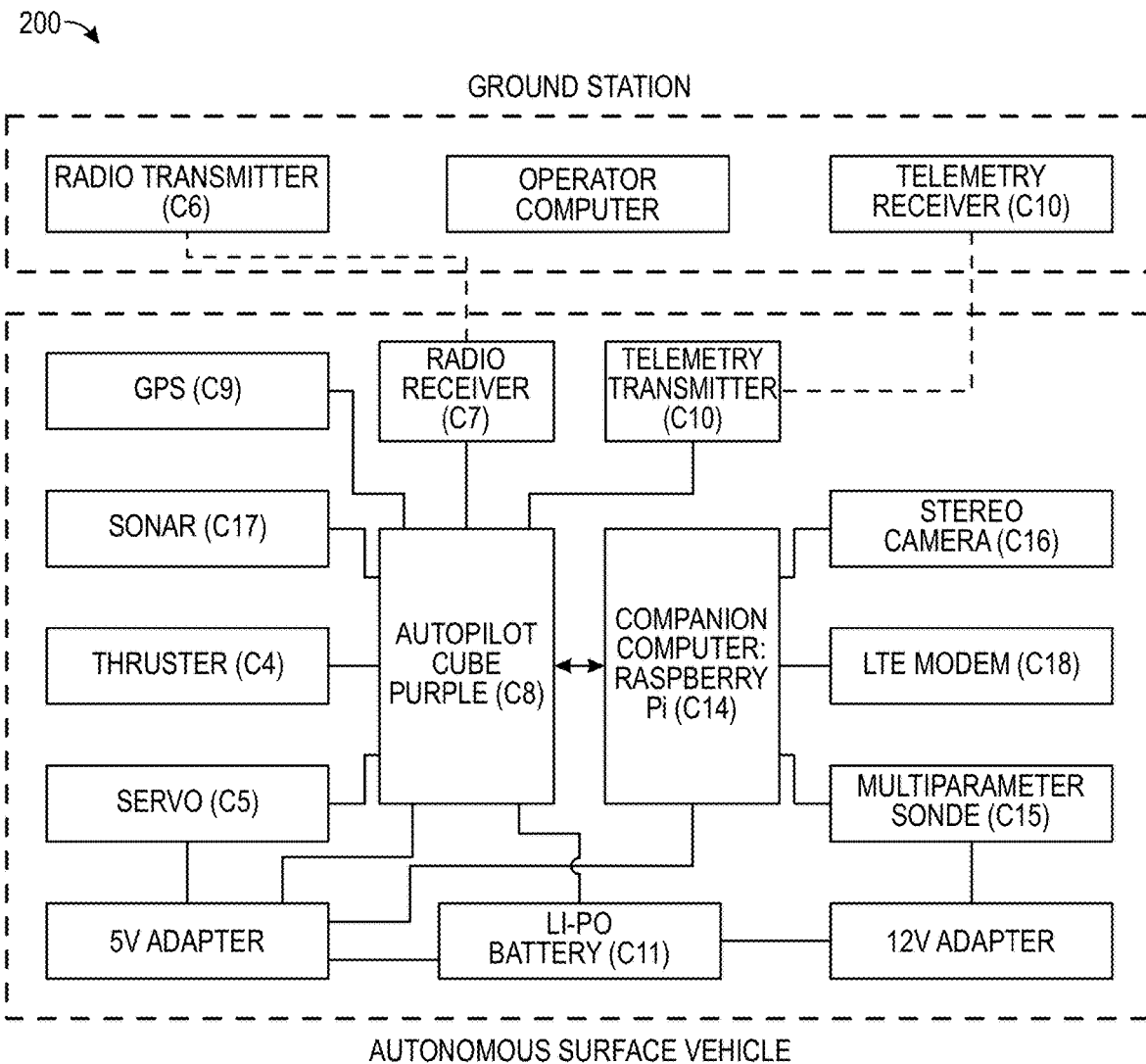
FIG. 2 is a schematic diagram of the hardware of an autonomous surface vehicle for large-scale Lagrangian monitoring of an aquatic resource, according to a reduction to practice.

FIG. 2 is a schematic diagram 200 of the hardware of an autonomous surface vehicle for large-scale Lagrangian monitoring of an aquatic resource, according to a reduction to practice. The diagram 200 shows both the autonomous surface vehicle and the ground station of the reduction to practice. Components are as shown and described herein in reference to FIG. 1 and further below.

The ground station, which may, in general, be housed at an onshore building, a mobile unit, or a boat, was used for deploying and using the autonomous surface vehicle of the reduction to practice. The ground control station's primary equipment was a laptop with ground control software installed. Additional components included a USB telemetry transmitter (C10) connected to the computer and an RC transmitter (C6). Wireless communication methods via telemetry transmitters were generally used to assign missions to autonomous surface vehicle. The ground station kept track of the status of autonomous surface vehicle and its onboard hardware and sent control instructions to remotely operated missions.

The reduction to practice used a website created using Ubidots to communicate with autonomous surface vehicle and visualize and download data. The reduction to practice used a simple interface for viewing previous data over a wide time range, visualizing real-time updates when data were received, and restricting viewing access as specified by the user. Any website using HTTP could be developed to communicate with autonomous surface vehicle. The data sent to the website included sonde readings, camera status, and GPS locations. Data were displayed as time-series plots with colored ranges and a map with pinpoints. The data were sent through the onboard USB LTE modem (C18).

The reduction to practice used the Luxonis Depth AI platform to save images taken from the Oak D lite camera (C16) in autonomous surface vehicle. This platform combines artificial intelligence, computer vision, depth perception (Stereo, ToF), and segmentation. Luxonis Depth AI was programmed to save images.

Figure 3:
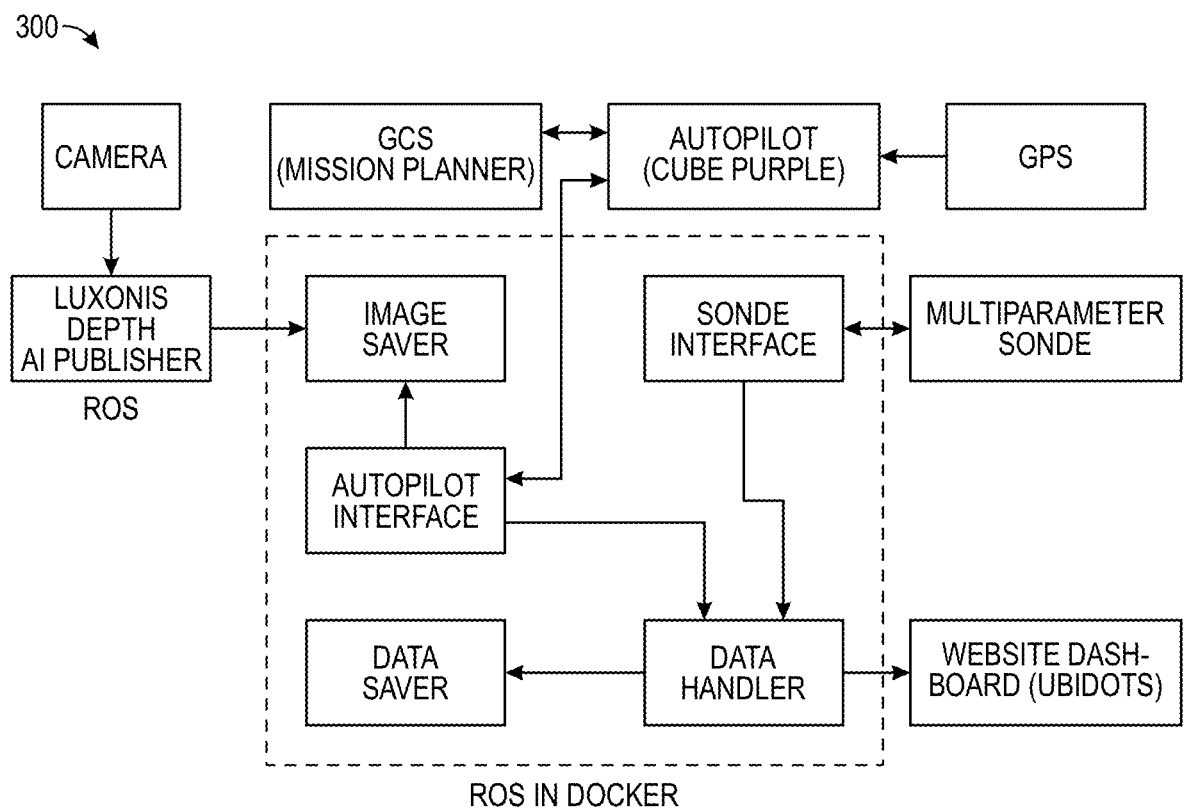
FIG. 3 is a schematic diagram of the software of an autonomous surface vehicle for large-scale Lagrangian monitoring of an aquatic resource, according to a reduction to practice.

FIG. 3 is a schematic diagram 300 of the software of an autonomous surface vehicle for large-scale Lagrangian monitoring of an aquatic resource, according to a reduction to practice. Components are as shown and described herein in reference to FIGS. 1 and 2 and further below.

The autonomous surface vehicle used an Ubuntu Desktop 22.04.1 LTS Linux operating system running on the Raspberry Pi 4 4 GB (C14). The software was designed as a set of Robot Operating System 2 (ROS2) nodes. Within the code developed for the reduction to practice, several nodes were responsible for a task onboard the autonomous surface vehicle. FIG. 3 presents the architecture of the software of the reduction to practice, with representative titles for the roles of the nodes and connections showing the topics that the nodes communicate through publishing and subscription.

The Autopilot system used ArduPilot's ArduRover version 3.5.2 firmware. The Autopilot underwent setup and calibration tasks. The operator installed a ground station on a field laptop to communicate with the Cube autopilot (C8) through the telemetry radio (C10). The data transmitted included GPS waypoints, battery health, the autopilot's sensor health, etc.

Figure 4:
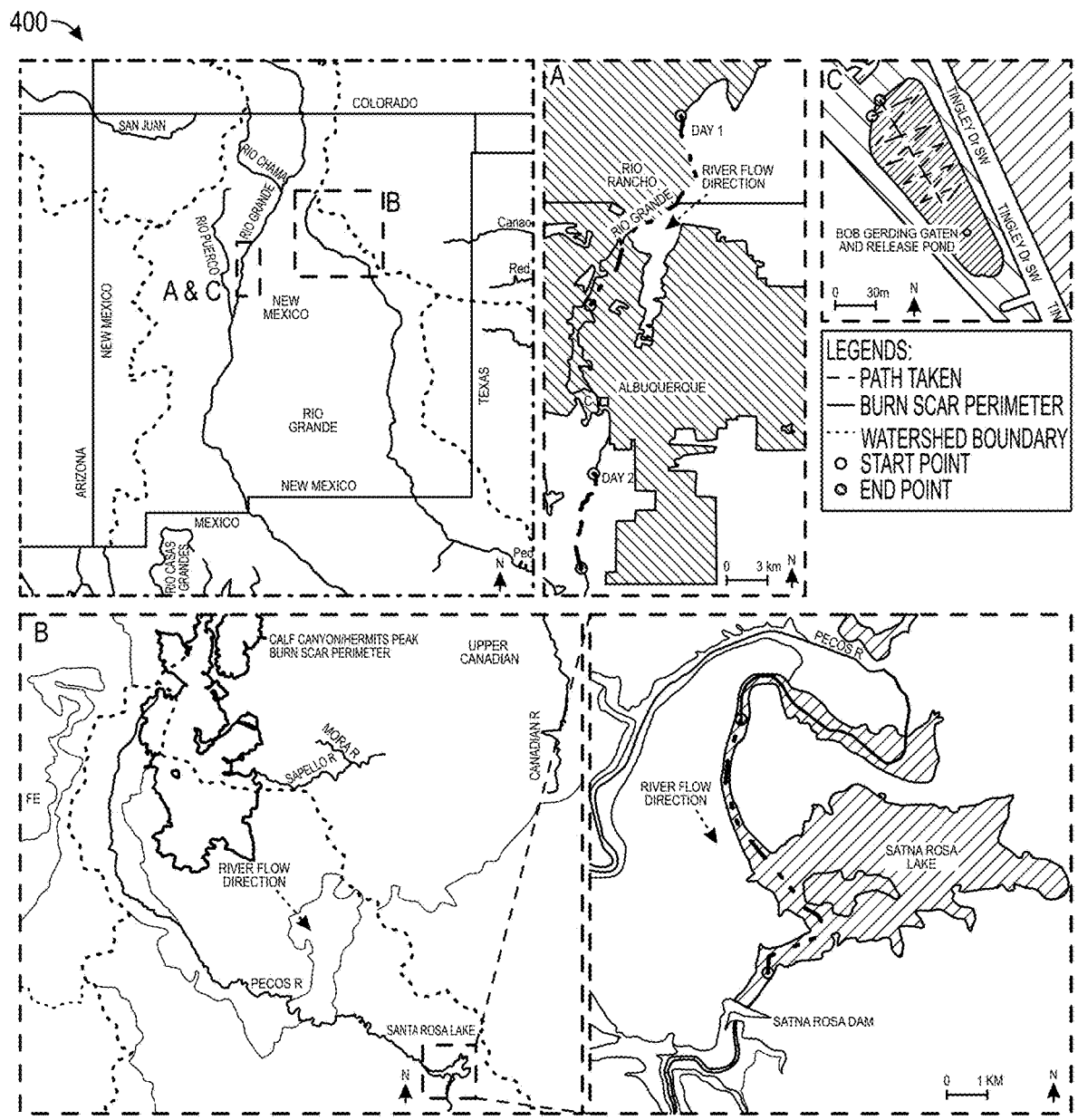
FIG. 4 depicts paths taken by an autonomous surface vehicle for large-scale Lagrangian monitoring of a portion of the Rio Grande, Santa Rosa Lake, and Bob Gerding catch and release pond, according to a reduction to practice.

FIG. 4 depicts paths (A), (B), and (C) taken by an autonomous surface vehicle for large-scale Lagrangian monitoring of a portion of the Rio Grande, Santa Rosa Lake, and Bob Gerding catch and release pond, according to a reduction to practice. In particular, this disclosure proceeds to present three field tests of the reduction to practice shown and described herein in reference to FIGS. 1-3. First, path (A) represents the path taken for Lagrangian monitoring of a 7th-order river reach in the Rio Grande using the drifting mode to understand where, how, and why water quality changes. Second, the path (B) represents the path taken for monitoring Santa Rosa Lake following GPS waypoints to characterize post-fire disturbances from the largest recorded wildfire in New Mexico, i.e., the Hermits Peak-Calf Canyon wildfire that occurred in the spring of 2022. The reduction to practice was deployed in autonomous mode to follow a waypoint path across the lake. Third, the path (C) represents the path taken for monitoring a small urban detention pond in the City of Albuquerque using the autonomous mode to collect high spatial resolution water quality data and depth along a grid path.

Figure 5:
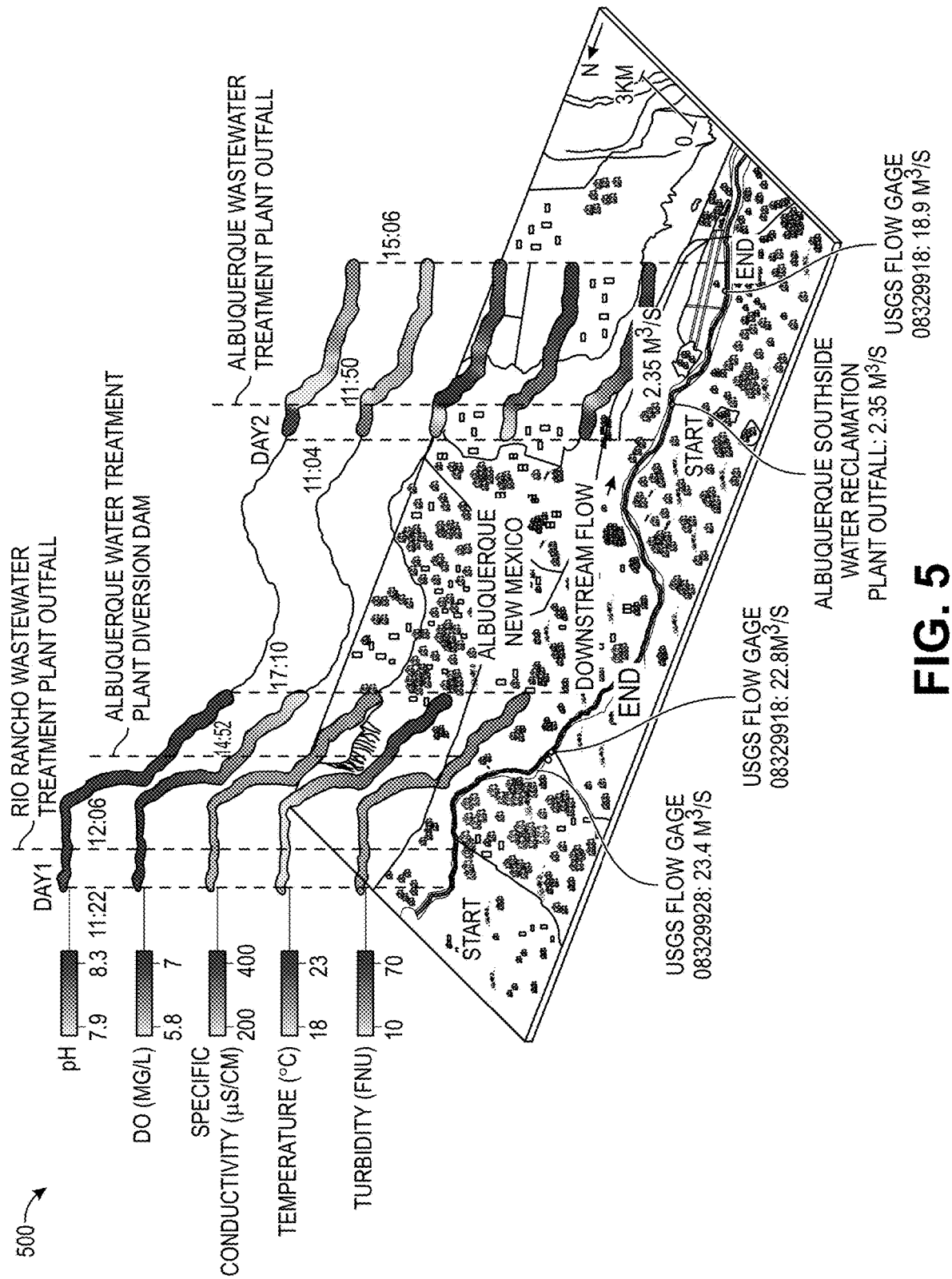
FIG. 5 depicts a heat map of water quality parameters of a portion of the Rio Grand obtained by an autonomous surface vehicle for large-scale Lagrangian monitoring, according to a reduction to practice.

FIG. 5 depicts a heat map 500 of water quality parameters of a portion of the Rio Grand obtained by an autonomous surface vehicle for large-scale Lagrangian monitoring, according to a reduction to practice. With the field information collected from water quality sensors and GPS data, heatmaps were generated using R's spacetime and trajectories package. These heatmaps (KMZ graphic format) were later imported into Google Earth to create the layered water quality heat map 500 to display water quality data in a longitudinal framework.

On two days (day 1 and day 2), the reduction to practice was deployed to monitor 28.43 km of the Rio Grande near the City of Albuquerque in drifting mode, i.e., moving with the river's current. See FIG. 4, path (A). The watershed draining area is ~37,221 km2 and features ~55% shrub and grassland, 36% forest, and ~2.8% developed land. The reach starts ~58 km downstream of Cochiti Lake, a flood and flow control reservoir that removes sediment from the river. This section of the river features the City of Rio Rancho's wastewater treatment plant (WWTP) return effluent, the City of Albuquerque's water intake for drinking supply, storm and agricultural return flow channels, and the City of Albuquerque's WWTP return effluent. The United States Geological Survey (USGS) operates several stream gages in this reach, i.e., USGS 08329918 at Alameda Bridge, USGS 08329928 near Paseo Del Norte Bridge, and USGS 08330830 at Valle de Oro, which were used to report flow data.

The reduction to practice collected data every two minutes for five hours and 48 min on day 1 and for four hours and 52 min on day 2. This corresponded to an average of one sampling event every 114 m on day 1 and every 80 m on day 2. The reduction to practice collected GPS, turbidity, pH, temperature, dissolved oxygen (DO), and specific conductivity (SC) data (FIG. 5). The remote steering controller was activated only when the vehicle was drifting near thick riparian vegetation and near the diversion dam used by the water treatment plant's intake facility. The reduction to practice was followed using a kayak through the reaches, and the functioning of real-time data telemetry was verified with the Ubidots website dashboard.

The data collected by reduction to practice revealed spatial and temporal changes in water quality parameters (FIG. 5). On day 1, an increase in water temperature was observed from 17.0 to 22.6° C. (FIG. 5), which may have been due in part to daily changes in air temperature over the monitoring period. A longitudinal increase in specific conductivity from 273.3 to 291.7 µS/cm was also observed, with abrupt changes near releases from the WWTP of the City of Rio Rancho (i.e., 273.8 to 299.6 µS/cm) and runoff outlets from unlined channels or arroyos (i.e., 281.3 to 290.4 µS/cm). These changes were local, as lateral discharges were orders of magnitude smaller than that from the Rio Grande, e.g., ~0.3 m3/s in the Rio Rancho WWTP and 23.4 m3/s in the river. During the monitoring, the inflatable diversion dam controlling the water intake from the Rio Grande into the water treatment plant of the City of Albuquerque was raised and created water stagnation upstream and high turbulence downstream. To avoid the dam, the reduction to practice was directed to the fish bypass channel and detected changes in turbidity from 33-37 FNU upstream to 40-49 FNU downstream.

On day 2, the reduction to practice registered drastic water quality changes as it passed through the Albuquerque WWTP outfall, which has a maximum capacity of 76 MGD (i.e., 3.3 m3/s), making it the largest in New Mexico. That day, the Rio Grande's average flow was 18.9 m3/s, and the ABQ WWTP effluent discharge was 2.3 m3/s. Specific conductivity values were recorded as increasing from 276.1 to 689.8 µS/cm and temperatures rising from 18.7 to 22.9° C. (FIG. 5).

The temperature and conductivity values gradually decreased downstream of the WWTP point source for 4 km and then rose gradually as a part of a diel cycle. Similarly, reduction to practice registered changes in DO from 6.5 to 5.3 mg/L, turbidity from 53.1 to 8.8 FNU, and pH from 8.1 to 7.1. These values also gradually rose to those upstream of the Albuquerque WWTP. This shows how reduction to practice monitored water quality parameters at higher spatial and temporal resolutions, supporting identifying sources and assessing their impacts at spatial scales unattainable by Eulerian monitoring or grab sampling.

Figure 6:
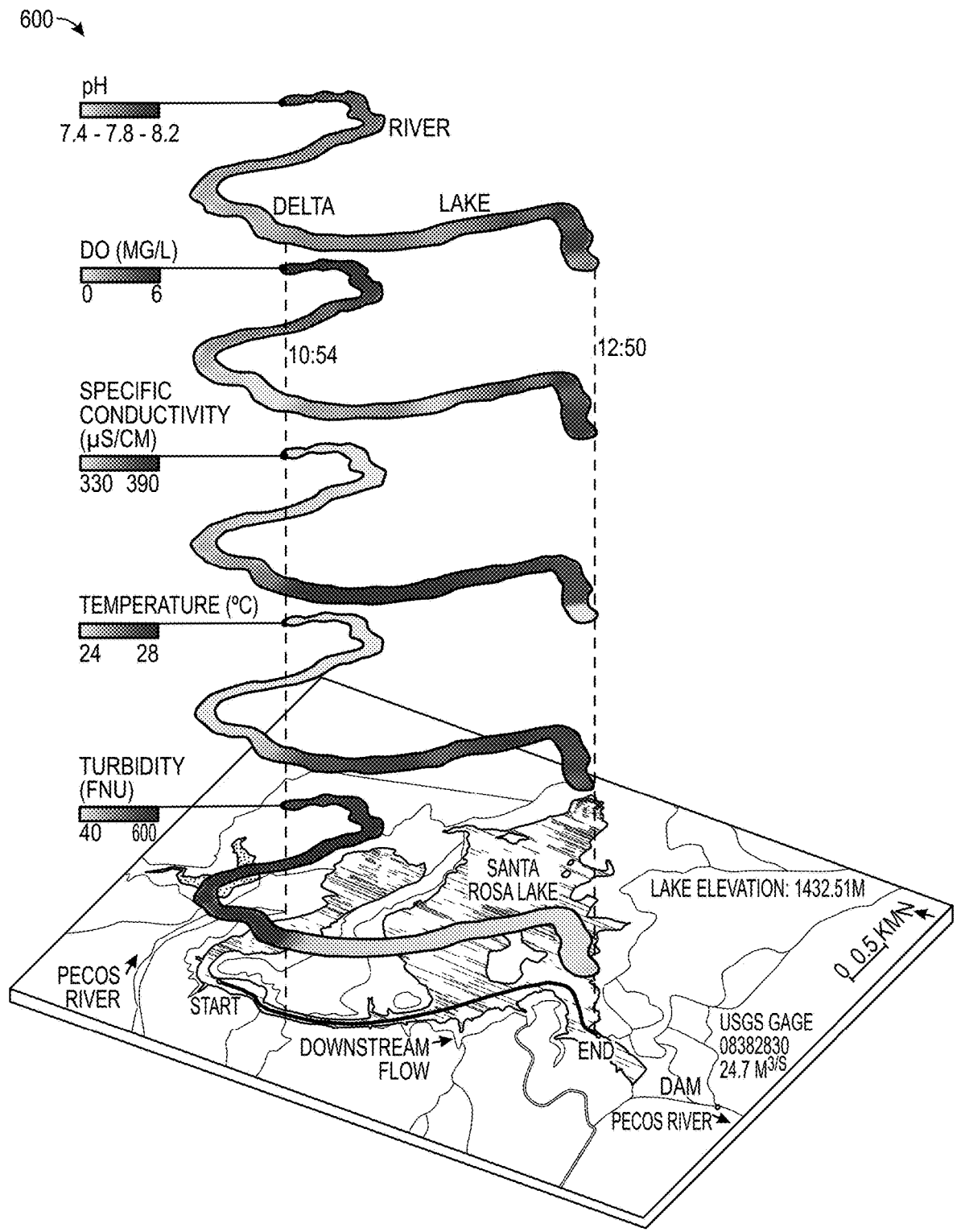
FIG. 6 depicts a heat map of water quality parameters of Sant Rosa Lake obtained by an autonomous surface vehicle for large-scale Lagrangian monitoring, according to a reduction to practice.

FIG. 6 depicts a heat map 600 of water quality parameters of Sant Rosa Lake obtained by an autonomous surface vehicle for large-scale Lagrangian monitoring, according to a reduction to practice. The reduction to practice was equipped with an autopilot system capable of following GPS waypoints to track water quality changes autonomously. With support for site access from the US Army Corps of Engineers (USACE) Albuquerque District, a high-resolution Lagrangian monitoring of water quality changes associated with the mobilization of wildfire disturbances after the Hermit's Peak-Calf Canyon Fire (FIG. 4, path (B)) was conducted. Postfire, after the storms from the monsoon season started to mobilize burned materials from the burned area into Gallinas Creek and into the Pecos River, water quality was monitored from Santa Rosa Lake and its upstream delta, which are located ~175 km downstream from the burn scar perimeter.

For this deployment, the reduction to practice was to intended to determine how the discontinuity of a river system brought by a flow-regulating dam impacted the propagation of wildfire disturbances in a fluvial network. Therefore, the Pecos River Delta-Santa Rosa Lake transition was monitored for ~8 km at a fine sampling spatial scale of about one sample every 64 m. The monitoring was conducted after a precipitation event of 9.4 mm fell over the burn scar and mobilized debris and sediments. The longitudinal monitoring followed the direction of the flow, which was 13.1 m3/s, exceeding the median of 1.0 m3/s between 1977-2022.

The data from the reduction to practice revealed drastic changes in the spatial patterns of water quality parameters (FIG. 6). DO transitioned from ~6 mg/L in the Pecos River upstream of the delta, to anoxic conditions (~0 mg/L) near the delta, and then rose as the water reached the dam. The DO sag and recovery patterns were inversely proportional to the turbidity values, suggesting that microbial respiration or chemical oxygen demands (DO sink) and photosynthesis (DO source) were largely controlled by sediment fluxes from the wildfire. pH values were lower in zones with low DO, suggesting increased aerobic microbial metabolism and CO2 releases associated with the high influx of sediment from wildfire material. Specific conductivity and temperature increased along the flow path following the DO trend. During the monitoring activity, high sediment loads come from Gallinas Creek and the Pecos River sinking along the delta due to the reduced flow velocity.

The monitoring with the reduction to practice indicated drastic changes in water quality parameters over short distances along the lake in response to post-wildfire rainfall-runoff events occurring hundreds of kilometers upstream. This allowed for identification of hotspots and plausible sources and sinks of physicochemical parameters. Since the monitoring lasted <2 h, the data from the lake are not as affected by diel cycles as those from the Rio Grande (FIG. 5). This helped elucidate how lakes affect the longitudinal propagation of wildfire disturbances along fluvial networks, acting as sinks and resetting the mobilization of wildfire material that becomes part of the lakebed. The results bring into focus the importance of longitudinal monitoring and highlight the importance of selecting adequate sampling locations and spatial coverages.

Figure 7:
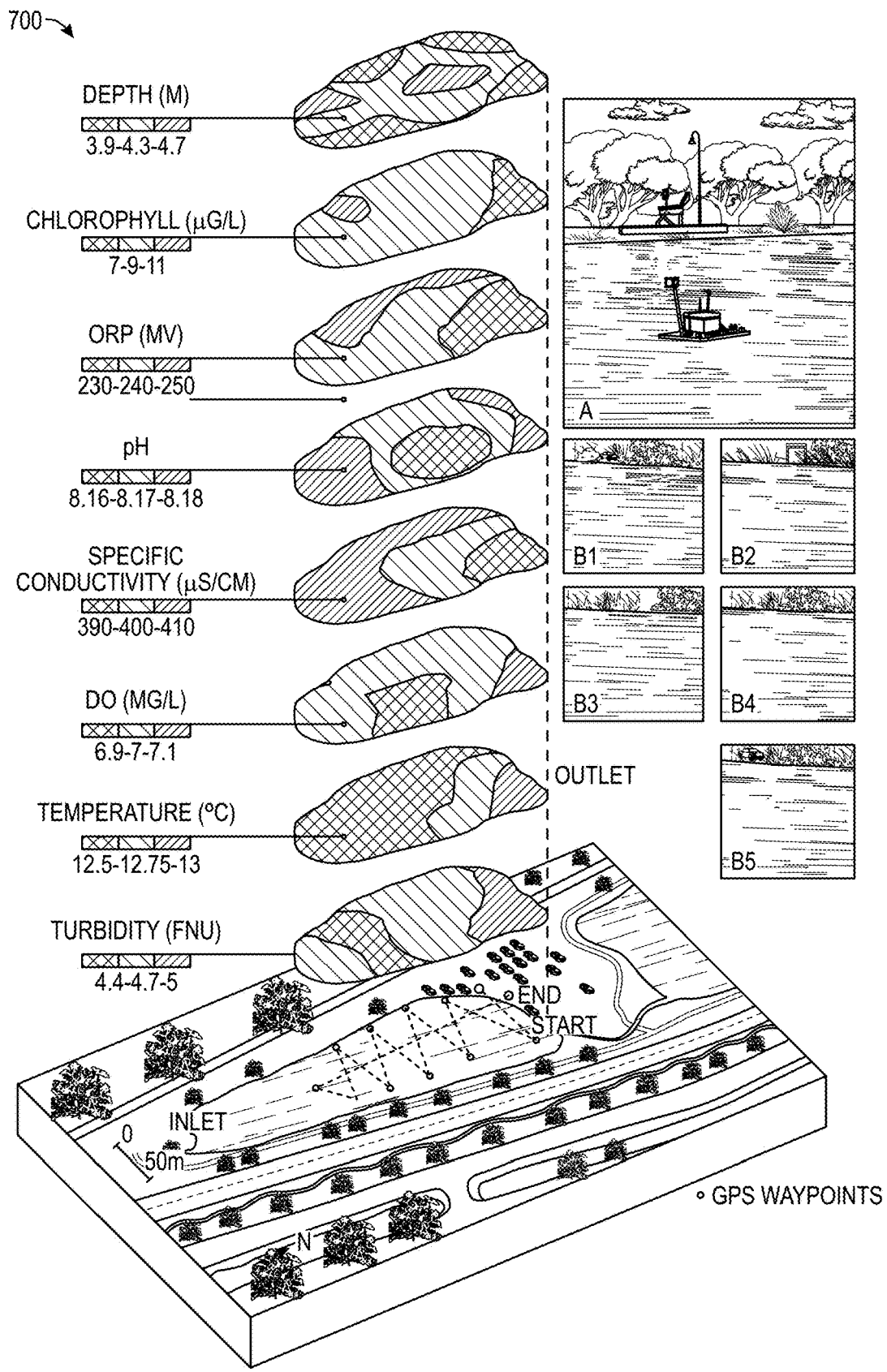
FIG. 7 depicts a heat map of water quality parameters of Bob Gerding catch and release pond obtained by an autonomous surface vehicle for large-scale Lagrangian monitoring, according to a reduction to practice.

FIG. 7 depicts a heat map 700 of water quality parameters of Bob Gerding catch and release pond obtained by an autonomous surface vehicle for large-scale Lagrangian monitoring, according to a reduction to practice. The reduction to practice was deployed in this recreational fishing pond in the City of Albuquerque (FIG. 4, path (C)). A GPS grid path mission of 400 m was used to monitor the north side of the pond using Mission Planner. The monitoring activity lasted 25 min, was completed at an average speed of 0.27 m/s, and used a sampling frequency of one sample per minute, amounting to about one sample every 16 m. The reduction to practice monitored turbidity, pH, temperature, DO, conductivity, oxygen reduction potential (ORP), and chlorophyll-A. The depth sonar and an Oak D-lite camera were added. A zig-zag grid path was chosen to gather high spatial resolution of water quality parameters and test the maneuverability of the reduction to practice.

As expected, minimum changes in surface water quality parameters were observed, due to the small size of the pond and the short duration of the monitoring, as shown by the heat map 700. The values observed fell within expectations for low sediment, small ponds. Logistically, this test is similar to monitoring a point source or the confluence of two streams. Thus, the autonomy of some embodiments allows researchers and practitioners to monitor wide water bodies from a single location while collecting high spatial resolution data on water quality parameters and depth.

Figure 8:
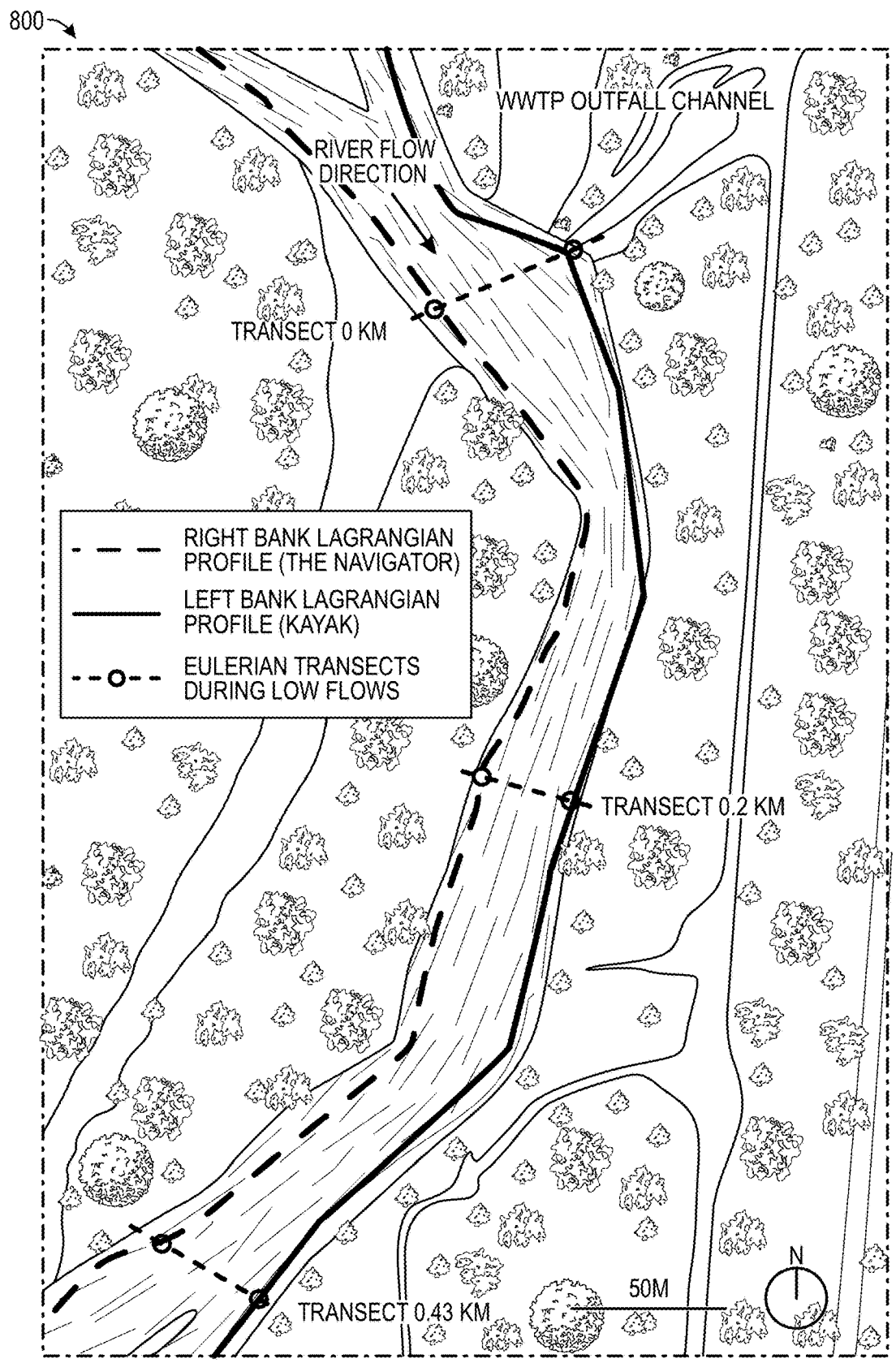
FIG. 8 depicts paths taken on a 9 km reach of the Rio Grand by a kayak and an autonomous surface vehicle for large-scale Lagrangian monitoring, according to a reduction to practice.

FIG. 8 depicts paths 800 taken on a 9 km reach of the Rio Grand by a kayak and an autonomous surface vehicle for large-scale Lagrangian monitoring, according to a reduction to practice. In particular, FIG. 8 depicts paths taken for monitoring a mixing zone, i.e., an area where active mixing and dilution of effluents occurs. The Lagrangian monitoring (e.g., monitoring as the flow goes) tracked water parcels that followed the flow of the river, and mixing lengths were established where and when the homogeneity of water quality parameters was detected.

Mixing lengths downstream of a WWTP discharge in the Rio Grande near Albuquerque, NM, were quantified. The monitoring was done under six different river flow conditions, generating river to WWTP discharges ranging from 1 to 33. Therefore, the monitoring provided opportunities to investigate how mixing lengths vary as a function of flow dynamics in shallow, wide river reaches. The mixing lengths were monitored along the two banks of the river using Lagrangian sampling with a reduction to practice and an instrumented kayak. The monitoring was conducted on a ~9 km reach of the Rio Grande near Albuquerque under six flow conditions ranging from 3.7 m³/s to 50.9 m³/s, with a mean discharge of 16.7 m³/s. The reach is also located near the City of Albuquerque, where the treated effluent of the Southside Water Reclamation Plant is discharged. This wastewater treatment plant (WWTP) serves over 600,000 people and has an average daily effluent discharge of 2.6-3.2 m³/s. The monitored reach starts 1.2 km upstream of the outfall of the wastewater treatment plant and ends 7.8 km downstream of the point source.

The spatiotemporal variability of multiple water quality parameters along the left and right banks reach was monitored to characterize mixing lengths. These data were collected on the left bank using a reduction to practice. The right bank was monitored using a kayak carrying a multi-parameter YSI EXO2 sonde and a handheld GPS tracker to monitor the same parameters. The monitoring was completed under four different flow conditions, i.e., Qup: Qwwtp of 5.5, 7.3, 12.5, and 22.1. On average, the data were collected at a spatial resolution of 72-102 m, over 2 hr 16 min-3 hr 48 min of navigation.

In low flows with $Q_{up}$: $Q_{wwtp}$ of 3.6 and 2.4, Eulerian monitoring was used, with the same multiparameter YSI EXO2 sondes positioned along 11 transects spaced 200 m-2 km apart, depending on site access to the river.

From the monitoring, heat maps for water quality parameters were generated using the spacetime and trajectories package from R and the sondes and GPS data. (See FIGS. 9 and 10.) Experimental mixing lengths (Lm) were estimated for each parameter as the distance required for left and right bank values to become ±5% equal or uniform downstream of the WWTP outfall. Use of this criterion confirmed that water quality parameter values upstream of the WWTP outfall were uniform.

The heatmaps (KMZ files) were arranged next to one other and imported into Google Earth to create layered water quality maps to display water quality data under different dilution ratios.

Figure 9:
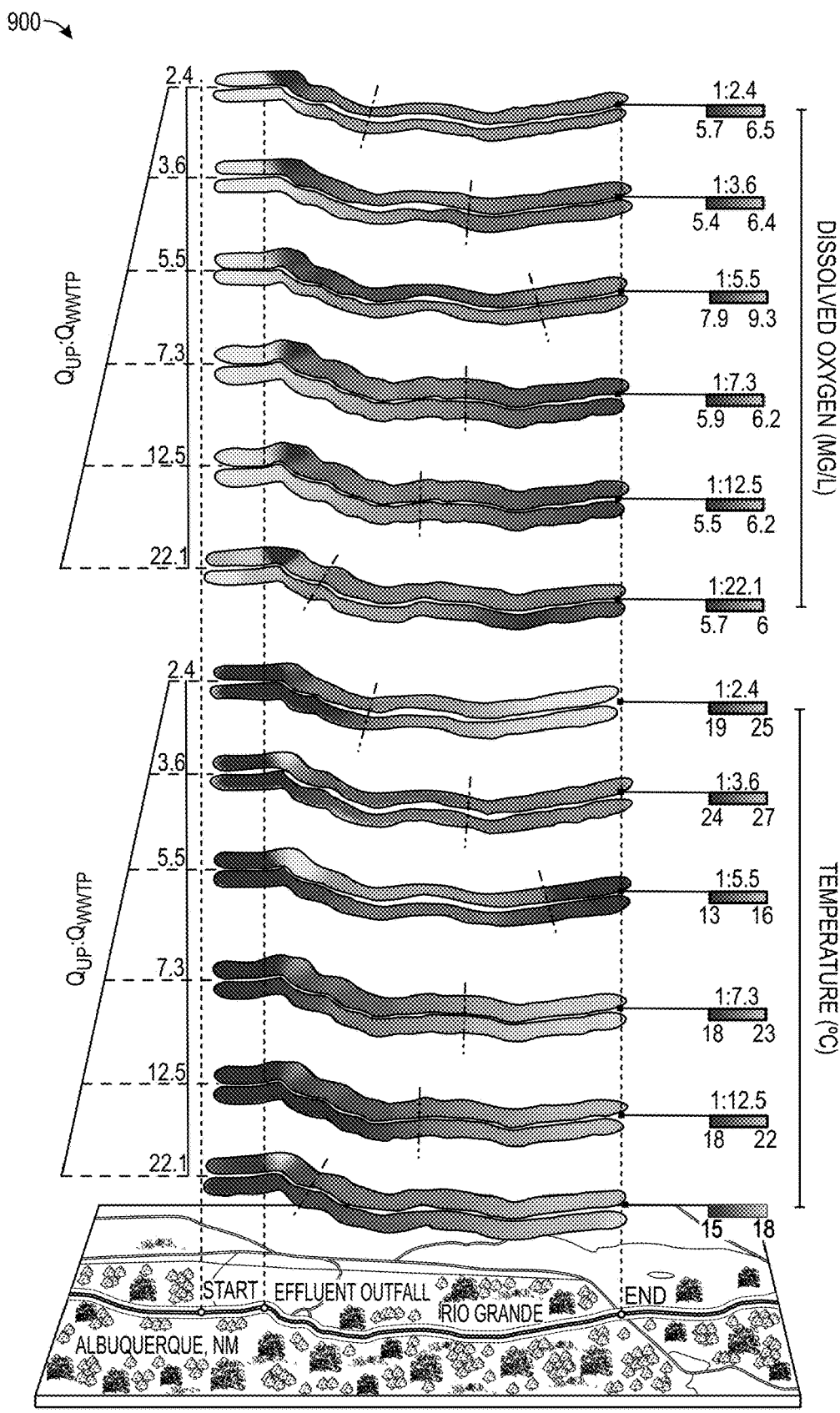
FIG. 9 shows longitudinal profiles of dissolved oxygen and temperature observed upstream and downstream of a wastewater treatment plant by a reduction to practice of an autonomous surface vehicle for large-scale Lagrangian monitoring of an aquatic resource.

FIG. 9 shows longitudinal profiles 900 of dissolved oxygen and temperature observed upstream and downstream of a wastewater treatment plant by a reduction to practice of an autonomous surface vehicle for large-scale Lagrangian monitoring of an aquatic resource. The paths taken for the monitoring depicted in FIG. 9 are shown and described above in reference to FIG. 8. In particular, FIG. 9 shows longitudinal profiles of dissolved oxygen and temperature observed upstream and downstream of the Albuquerque wastewater treatment plant (WWTP) effluent during different flow conditions (Qup: Qwwtp). The left bank (outfall side) data are on top of right bank data. Dash lines indicate the experimental mixing lengths (Lm), where left and right bank data are within 5% difference downstream of the WWTP.

Figure 10:
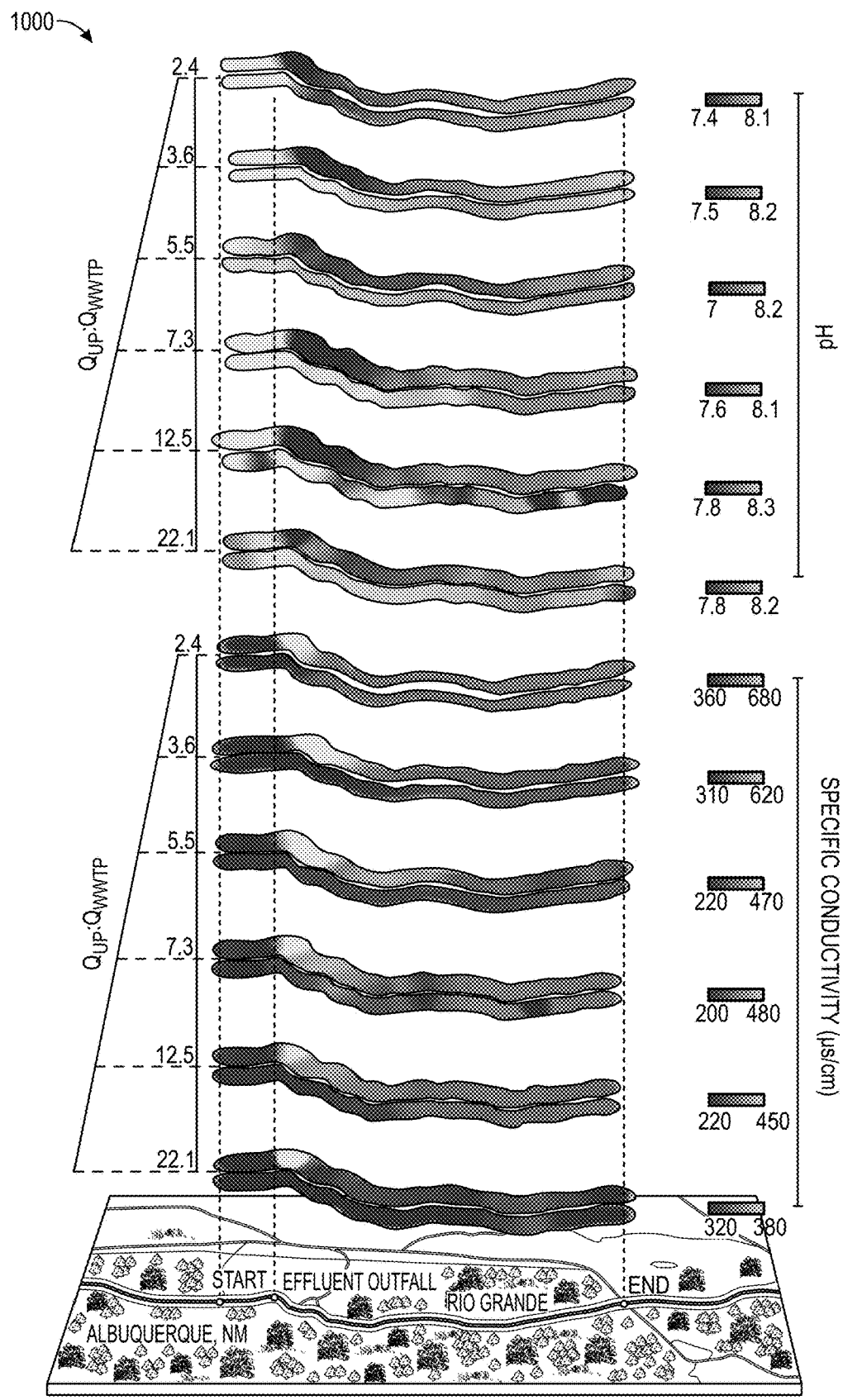
FIG. 10 depicts longitudinal profiles of pH and specific conductivity observed upstream and downstream of a wastewater treatment plant by a reduction to practice of an autonomous surface vehicle for large-scale Lagrangian monitoring of an aquatic resource.

FIG. 10 depicts longitudinal profiles 1000 of pH and specific conductivity observed upstream and downstream of a wastewater treatment plant by a reduction to practice of an autonomous surface vehicle for large-scale Lagrangian monitoring of an aquatic resource. The paths taken for the monitoring depicted in FIG. 9 are shown and described above in reference to FIG. 8. In particular, FIG. 10 shows longitudinal profiles of pH and specific conductivity observed upstream and downstream of the Albuquerque wastewater treatment plant (WWTP) effluent during different flow conditions (Qup: Qwwtp). The left bank (outfall side) data are on top of right bank data. Dash lines indicate the experimental mixing lengths (Lm), where left and right bank data are within 5% difference downstream of the WWTP.

Figure 11:
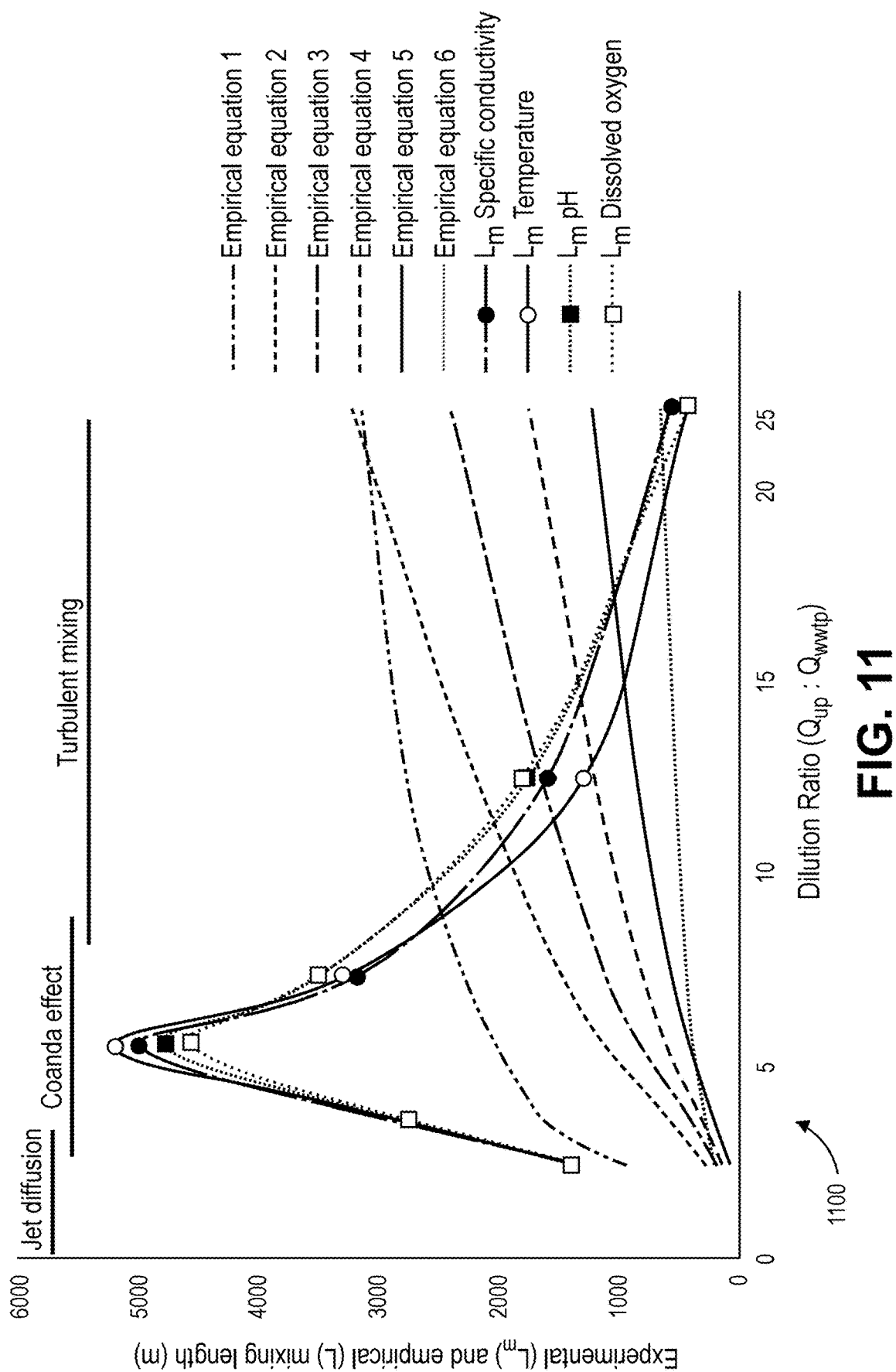
FIG. 11 is a graph illustrating mixing lengths determined by a reduction to practice and empirical mixing lengths, as functions of the dilution ratio.

While longer mixing length predictions generate more conservative and cautious estimates to help protect downstream water users, the results shown and described in reference to FIGS. 8, 9, and 10 indicate that commonly used empirical equations may consistently underpredict mixing lengths in intermediate flow regimes, e.g., where the Coanda effect controls mixing. FIG. 11 illustrates this disparity in detail.

FIG. 11 is a graph 1100 illustrating mixing lengths determined by a reduction to practice (Lm) and empirical (L) mixing lengths, as functions of the dilution ratio (Qup: Qwwtp). The empirical equations represented in the graph 1100 are set forth in the Equation Table below. The reach characteristics used to populate those equations include average velocity, depth, width, channel irregularity, and longitudinal slope values. The hydraulic parameters velocity, depth, and width were obtained from USGS data from the upstream station. Onsite observations of channel meandering and inspection of satellite imagery were used to determine a qualitative measure of channel irregularity (sinuosity) and longitudinal slopes.

Equation Table

| Source | Equation | |
|---|---|---|
| Mixing length zone (Fischer 1979) | $L = \dfrac{kb^2 U}{R u_2}$ | (1) |
| Length of the longitudinal mixing zone (Rutherford 1994) | $L = 0.536\dfrac{U s^2}{Dy}$ | (2) |
| Mixing length equation (G. Jirka and Weitbrecht 2005; Skorbilowicz et al. 2017) | $L = 0.4\dfrac{U s^2}{Dy}$ | (3) |
| Mixing length equation (Rup 2006; Skorbilowicz et al. 2017) | $L = 0.29\dfrac{U s^2}{Dy}$ | (4) |
| One half width mixing equation. (Cleasby and Dodge 1999) | $L = \dfrac{0.4(b/2)^2 U}{Dy}$ | (5) |
| European Union rule of thumb for river mixing zone. (Environmental Quality Standards 2008) | $L = 10\,b$ | (6) |

In Table 1, L is the empirical mixing length, b is the channel width, U is the mean velocity, R is the hydraulic radius, u* is the shear velocity, s is the linear transverse scale, Dy is the transverse dispersion coefficient (Dy~0.3 m2/s for the Rio Grande), and k is a channel type constant (k~10 for the Rio Grande).

As shown in FIG. 11, the mixing lengths measured by the reduction to practice follow a bell-shaped pattern with river flows and dilution ratios Qup: Qwwtp, i.e., low and high flows have smaller mixing lengths and intermediate flows have greater magnitudes (see also FIGS. 9 and 10). Multiple mixing lengths were obtained from each water quality parameter tracked for a specific river flow or dilution ratio, even though they all followed the same bell-shaped patterns. This suggests that contrasting phenomena at low and high flows may affect mixing length patterns similarly. Notably, as shown in FIG. 11, all the empirical equations used to compare the measurements of the reduction to practice predicted a monotonically increasing mixing length with discharge and misrepresented our data. None of the empirical equations can reproduce the bell-shaped mixing length pattern observed for all water quality parameters using the Lagrangian monitoring of the reduction to practice. The empirical equations are necessarily monotonically increasing and vary from simple to intermediately complex considerations derived from one-dimensional transport models.

Generally, the discrepancy between the predictions from the empirical equations grew with river discharge, as all are proportional to flow velocity. In low flows with 2.4<Qup: Qwwtp<3.6, the mixing lengths measured by the reduction to practice were 1.5× to 7.5× longer than the predictions with empirical equations. In the intermediate flow region where the Coanda effect dominated, the mixing lengths measured by the reduction to practice were 2.5×-13× greater. In the highest Qup: Qwwtp=22.1, the mixing lengths measured by the reduction to practice were 3×-7.5× smaller.

These results indicate that commonly used empirical equations may consistently underpredict mixing lengths in intermediate flow regimes, e.g., where the Coanda effect controls mixing. The tendency of the empirical equations to underpredict could result in higher pollution risks for human populations capturing water from the same bank of upstream effluent discharges. Embodiments may solve this underprediction through Lagrangian monitoring using an autonomous surface vehicle, supplemented using Eulerian monitoring for shallow portions of the resource, as shown and described herein in reference to FIGS. 8, 9, and 10.

Figure 12:
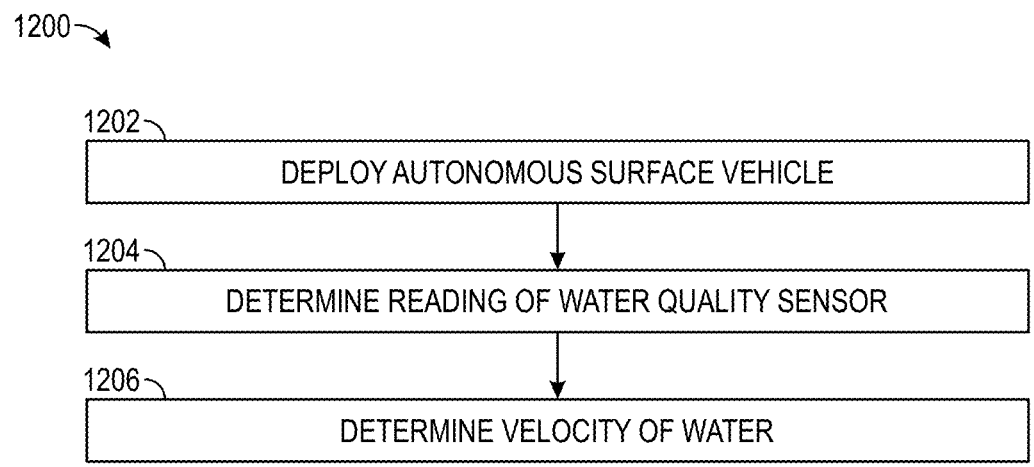
FIG. 12 a flow diagram of a method of large-scale Lagrangian monitoring of an aquatic resource, according to various embodiments.

FIG. 12 is a flow diagram of a method 1200 of large-scale Lagrangian monitoring of an aquatic resource, according to various embodiments. The method 1200 may be practiced using a system, e.g., as shown and described herein in reference to FIG. 1.

At 1202, the method 1200 includes deploying a system, which may include an autonomous surface vehicle. The autonomous surface vehicle may include: an electronic controller, a power source coupled to the electronic controller, a plurality of sensors communicatively coupled to the electronic controller, where the plurality of sensors include: a water quality sensor and a GPS sensor, and a propulsion system communicatively coupled to the electronic controller, where the propulsion system includes a thruster and a rudder system. In general, the system may include an autonomous surface vehicle and associated interface(s) as shown and described herein.

At 1204, the method 1200 includes determining a reading of the water quality sensor. Any of a variety of water quality readings may be determined, including, by way of non-limiting example: temperature, dissolved oxygen, conductivity, pH, turbidity, oxidation-reduction potential, chlorophyll, partial pressure of carbon dioxide, dissolved methane, and/or photosynthetically active radiation.

At 1206, the method 1200 includes determining a velocity of water in the aquatic resource based on a plurality of position signals from the GPS sensor, e.g., during a passive navigation mode. For example, the velocity may be determined according to Lagrangian monitoring, where the autonomous surface vehicle drifts, together with a water parcel, according to a current of the aquatic resource.

As shown and described herein, embodiments may facilitate the linkage between Eulerian datasets collected at a site (e.g., USGS stream flows and water quality data) and Lagrangian-based monitoring to provide a better understanding of where, how, and why spatiotemporal variation in water chemistry and biogeochemical processing occurs. Whether Lagrangian monitoring alone, or supplemented with Eulerian monitoring, this technology has numerous critical applications, primarily in the water technology and energy and food sectors (i.e., across the food-energy-water FEW nexus). Embodiments can help develop holistic strategies to manage FEW resources as it provides high spatiotemporal resolution capturing the impacts of land use changes, point and diffuse sources, and climate variability on freshwater systems. Embodiments can help identify risks relevant to the water supply for drinking, industrial, and agricultural activities and address concerns from the associated return flows (e.g., combined sewer overflows, thermal pollution, excess nutrients, etc.). Embodiments can inform agencies about water quality issues related to excess loads, dilution requirements, unwanted leakages to aquatic ecosystems, and gaining and losing conditions in rivers and lakes. The spatiotemporal water quality data generated by this development can support the development of regulation and enforcement of environmental flows, thermal pollution, and mitigation and restoration efforts post-disturbance (e.g., wildfires, spills, land use changes, etc.). Overall, embodiments can help address questions involving mass and energy balances in surface water ecosystems and support evidence-based decision-making.

Certain examples can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), flash memory, and magnetic or optical disks or tapes.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented using computer readable program instructions that are executed by an electronic processor.

These computer readable program instructions may be provided to a processor of a general-purpose computer, special purpose computer, or other programmable data processing apparatus to produce a machine, such that the instructions, which execute via the electronic processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on a user's computer, partly on the user's computer, as a stand-alone software package, partly on the user's computer and partly on a remote computer or entirely on the remote computer or server.

As used herein, the terms "A or B" and "A and/or B" are intended to encompass A, B, or {A and B}. Further, the terms "A, B, or C" and "A, B, and/or C" are intended to encompass single items, pairs of items, or all items, that is, all of: A, B, C, {A and B}, {A and C}, {B and C}, and {A and B and C}. The term "or" as used herein means "and/or."

As used herein, language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

While the invention has been described with reference to the exemplary examples thereof, those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A system for large-scale Lagrangian monitoring of an aquatic resource, the system comprising an autonomous surface vehicle, the autonomous surface vehicle comprising:
   an electronic controller;
   a power source coupled to the electronic controller;
   a plurality of sensors communicatively coupled to the electronic controller, the plurality of sensors comprising: a water quality sensor and a GPS sensor; and
   a propulsion system communicatively coupled to the electronic controller, the propulsion system comprising a thruster and at least one rudder;
   wherein the system determines a velocity of water in the aquatic resource based on a plurality of position signals from the GPS sensor.

2. The system of claim 1, wherein the water quality sensor comprises at least one of: a temperature sensor, a dissolved oxygen sensor, a conductivity sensor, a pH sensor, a turbidity sensor, an oxidation-reduction potential sensor, a chlorophyll sensor, a partial pressure of carbon dioxide sensor, a dissolved methane sensor, or a photosynthetically active radiation sensor.

3. The system of claim 1, wherein the autonomous surface vehicle further comprises a depth sonar sensor communicatively coupled to the electronic controller.

4. The system of claim 1, wherein the autonomous surface vehicle further comprises a radio frequency transmitter and a cellular modem communicatively coupled to the electronic controller, the system further comprising:
   a visualization portal in communication with the autonomous surface vehicle via the radio frequency transmitter and cellular modem, wherein the visualization portal displays readings from at least one of the plurality of sensors in real time.

5. The system of claim 1, wherein the autonomous surface vehicle is hydrostatically stable.

6. The system of claim 1, further comprising a camera communicatively coupled to the electronic controller, wherein the electronic controller is configured to identify an obstacle using the camera and avoid the obstacle using the propulsion system.

7. The system of claim 1, wherein the autonomous surface vehicle is configured to autonomously switch between active navigation using the propulsion system and passive navigation according to a current of the aquatic resource.

8. The system of claim 1, wherein the electronic controller acquires readings from the plurality of sensors at least once per two-minute interval.

9. The system of claim 1, wherein the autonomous surface vehicle has a navigation range of at least 45 km.

10. The system of claim 1, wherein the autonomous surface vehicle has a weight of less than 20 kg.

11. A method of large-scale Lagrangian monitoring of an aquatic resource, the method comprising:
    deploying an autonomous surface vehicle in the aquatic resource, the autonomous surface vehicle comprising:
    an electronic controller,
    a power source coupled to the electronic controller,
    a plurality of sensors communicatively coupled to the electronic controller, the plurality of sensors comprising: a water quality sensor and a GPS sensor, and
    a propulsion system communicatively coupled to the electronic controller, the propulsion system comprising a thruster and at least one rudder;
    determining a reading of the water quality sensor; and
    determining a velocity of water in the aquatic resource based on a plurality of position signals from the GPS sensor.

12. The method of claim 11, wherein the water quality sensor comprises at least one of: a temperature sensor, a dissolved oxygen sensor, a conductivity sensor, a pH sensor, a turbidity sensor, an oxidation-reduction potential sensor, a chlorophyll sensor, a photosynthetically active radiation sensor, a partial pressure of carbon dioxide sensor, or a dissolved methane sensor.

13. The method of claim 11, wherein the autonomous surface vehicle further comprises a depth sonar sensor communicatively coupled to the electronic controller.

14. The method of claim 11, wherein the autonomous surface vehicle further comprises a radio frequency transmitter and a cellular modem communicatively coupled to the electronic controller, the method further comprising:
    displaying, on a visualization portal in communication with the autonomous surface vehicle via the radio frequency transmitter and cellular modem, readings from at least one of the plurality of sensors in real time.

15. The method of claim 11, wherein the autonomous surface vehicle is hydrostatically stable.

16. The method of claim 11, wherein the autonomous surface vehicle further comprises a camera communicatively coupled to the electronic controller, the method further comprising:
    identifying, by the electronic controller, an obstacle using the camera; and
    avoiding the obstacle using the propulsion system.

17. The method of claim 11, further comprising:
autonomously switching, by the autonomous surface vehicle, between active navigation using the propulsion system and passive navigation according to a current of the aquatic resource.

18. The method of claim 11, further comprising:
acquiring, by the electronic controller, readings from the plurality of sensors at least once per two-minute interval.

19. The method of claim 11, wherein the deploying comprises deploying the autonomous surface vehicle through a range of at least 45 km.

20. The method of claim 11, wherein the autonomous surface vehicle has a weight of less than 20 kg.

* * * * *